(12) United States Patent
Suzuki et al.

(10) Patent No.: US 7,260,963 B2
(45) Date of Patent: Aug. 28, 2007

(54) ELECTRIC STEERING LOCK DEVICE

(75) Inventors: Noriyuki Suzuki, Aichi (JP);
Tomoyuki Funayama, Toyota (JP);
Toshio Asahi, Toyota (JP); Tomoo Kakegawa, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 275 days.

(21) Appl. No.: 10/508,233

(22) PCT Filed: Mar. 24, 2003

(86) PCT No.: PCT/JP03/03490

§ 371 (c)(1),
(2), (4) Date: Sep. 20, 2004

(87) PCT Pub. No.: WO03/080408

PCT Pub. Date: Oct. 2, 2003

(65) Prior Publication Data

US 2005/0138977 A1    Jun. 30, 2005

(30) Foreign Application Priority Data

Mar. 22, 2002    (JP) ............................ 2002-081723

(51) Int. Cl.
*B60R 25/02* (2006.01)
(52) U.S. Cl. .......................................... 70/186; 70/252
(58) Field of Classification Search .......... 70/182–186, 70/252, 245, 280–282; 292/144
See application file for complete search history.

(56) References Cited

U.S. PATENT DOCUMENTS

| | | | | |
|---|---|---|---|---|
| 1,614,623 A | * | 1/1927 | Matthiesen | 70/185 |
| 1,668,395 A | * | 5/1928 | Carpenter | 70/186 |
| 1,736,900 A | * | 11/1929 | Carpenter | 70/185 |
| 5,495,732 A | * | 3/1996 | Nagae et al. | 70/252 |
| 5,896,765 A | * | 4/1999 | Peyre et al. | 70/186 |
| 6,324,878 B1 | * | 12/2001 | Ramamurthy et al. | 70/186 |
| 6,543,262 B2 | * | 4/2003 | Limburg et al. | 70/186 |
| 6,571,587 B2 | * | 6/2003 | Dimig et al. | 70/186 |
| 6,675,673 B2 | * | 1/2004 | Starken | 74/527 |
| 6,915,671 B2 | * | 7/2005 | Zillmann | 70/186 |

(Continued)

FOREIGN PATENT DOCUMENTS

DE    44 36 326 C1    10/1995

(Continued)

*Primary Examiner*—Suzanne Dino Barrett
(74) *Attorney, Agent, or Firm*—Patterson, Thuente, Skaar & Christensen, P.A.

(57) ABSTRACT

An electric steering lock device which can prevent a motor from being overloaded and can increase the drive force of the motor. The electric steering lock device of the present invention has a lock bar that moves according to the movement of a lift member. In a state where female threads provided on the lift member are threadably engaged with male threads provided on a rotary shaft, the lift member moves along the axis of the rotary shaft according to the rotation of the rotary shaft, which is driven by an electric motor. The female threads of the lift member can be disengaged from the male threads according to the rotation of the rotary shaft. When the female threads are disengaged from the male threads, rotation of the rotary shaft is permitted.

16 Claims, 8 Drawing Sheets

U.S. PATENT DOCUMENTS

| | | | |
|---|---|---|---|
| 7,007,525 B2 * | 3/2006 | Okuno et al. | 70/186 |
| 7,065,993 B2 * | 6/2006 | Fukushima | 70/252 |
| 7,086,256 B2 * | 8/2006 | Hasegawa | 70/186 |
| 7,111,480 B2 * | 9/2006 | Dimig et al. | 70/186 |
| 7,121,126 B2 * | 10/2006 | Zillmann | 70/186 |
| 2001/0025516 A1 * | 10/2001 | Starken | 70/186 |
| 2002/0023468 A1 * | 2/2002 | Frick et al. | 70/185 |

FOREIGN PATENT DOCUMENTS

| | | |
|---|---|---|
| EP | 1 167 134 A2 | 1/2002 |
| JP | 59-014562 | 1/1984 |
| JP | 60-148751 | 8/1985 |
| JP | 10-264770 | 10/1998 |

* cited by examiner

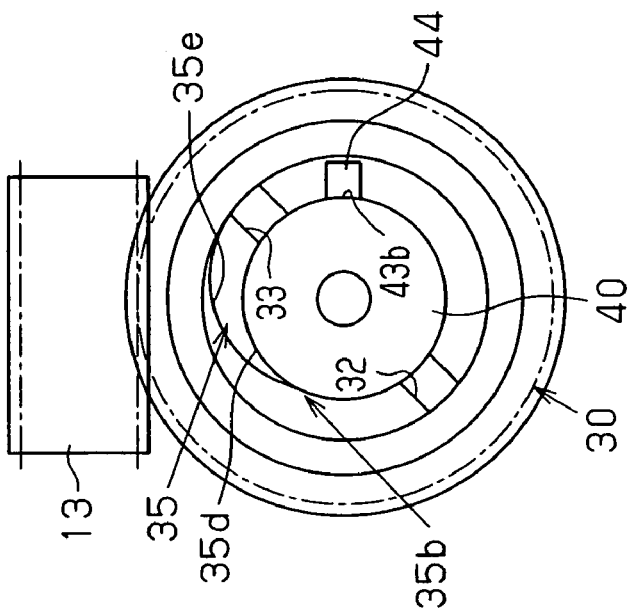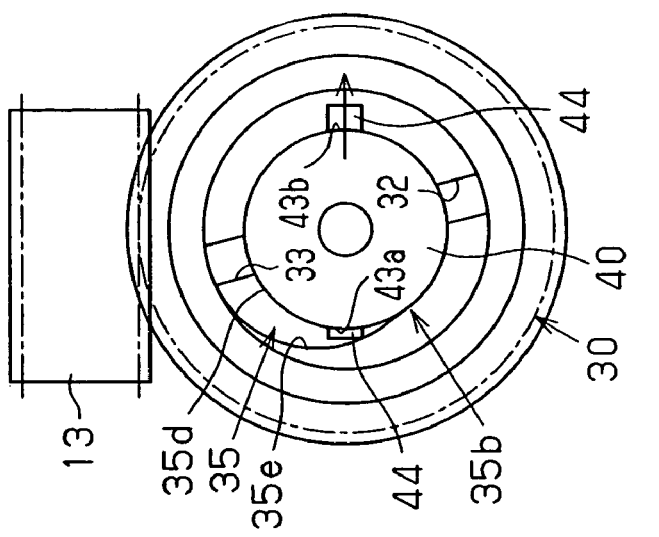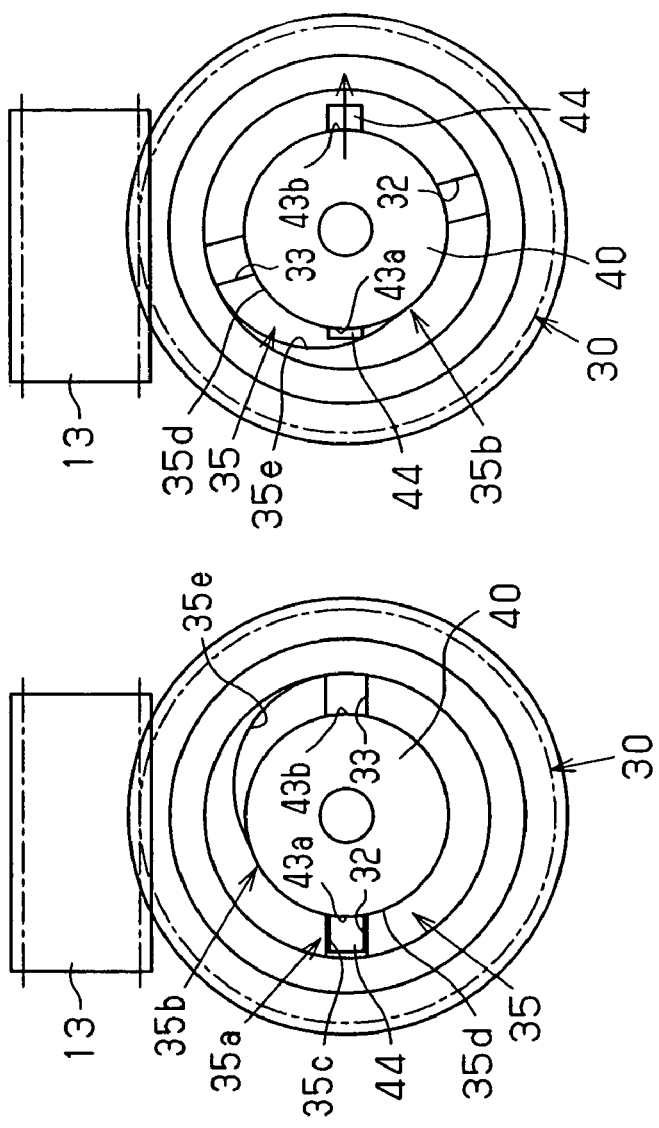

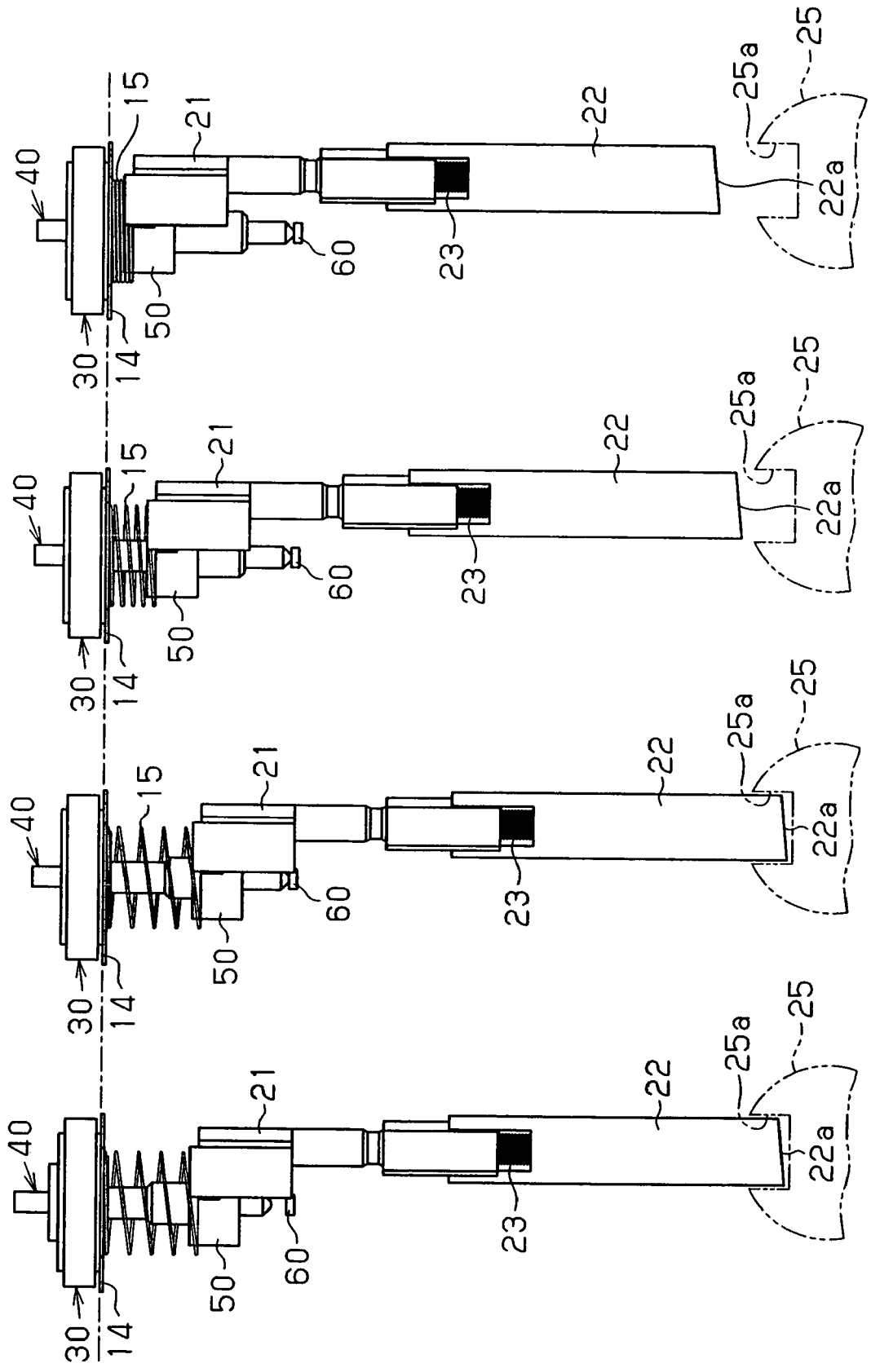

ELECTRIC STEERING LOCK DEVICE

FIELD OF THE INVENTION

The present invention relates to an electric steering lock device for automobiles.

BACKGROUND OF THE INVENTION

An ordinary electric steering lock device has a lock bar which is driven by a cam coupled to a motor. The lock bar is movable between a lock position where it is engaged with the steering shaft of a vehicle and an unlock position where it is not engaged with the steering shaft. When the lock bar is engaged with the steering shaft, the steering shaft is locked so that the steering shaft is not operable. When the lock bar is not engaged with the steering shaft, the steering shaft is unlocked so that the steering shaft is operable.

When the motor is kept running while the lock bar is at the lock position or at the unlock position, the motor may be overloaded. In this respect, an electric steering lock device equipped with a clutch mechanism has been proposed. The clutch mechanism is provided in the power transmission path between the motor and the cam to selectively block power transmission between the motor and the cam.

To quickly and surely lock and unlock the steering shaft, it is desirable to increase the drive force of the motor. However, the conventional clutch mechanism is so constructed as to be likely to be disengaged even with a relatively small load. Therefore, the drive force of the motor cannot be made so large.

SUMMARY OF THE INVENTION

It is an object of the present invention to provide an electric steering lock device which can prevent a motor from being overloaded and increase the drive force of the motor.

To achieve the object, the invention provides an electric steering lock device for selectively locking a movable member, which moves in response to a steering wheel. The electric steering lock device has a motor, a rotary shaft, a movable body, and a lock member. The rotary shaft is selectively rotated in a first direction and a second direction opposite to the first direction. The rotary shaft has first threads. The movable body has second threads threadably engageable within the first threads. The movable body moves along an axis of the rotary shaft as the rotary shaft rotates with the second threads threadably engaged within the first threads. The movable body moves in a third direction when the rotary shaft rotates in the first direction. The movable body moves in a fourth direction opposite to the third direction when the rotary shaft rotates in the second direction. The lock member is coupled to the movable body. The lock member moves between a lock position where it is engaged with the movable member to lock the movable member and an unlock position where it is disengaged from the movable member to unlock the movable member in accordance with movement of the movable body. The lock member moves toward the unlock position from the lock position when the movable body moves in the third direction. The lock member moves toward the lock position from the unlock position when the movable body moves in the fourth direction. As the rotary shaft rotates in the first direction with the lock member placed at the unlock position, the first threads permit the second threads to disengage from the first threads. This permits rotation of the rotary shaft in the first direction with the second threads disengaged from the first threads.

The present invention further provides another electric steering lock device for selectively locking a movable member, which moves in response to a steering wheel. The electric steering lock device has a motor, a rotary member, a rotary shaft, a coupling mechanism, a movable body, and a lock member. The rotary member is rotated by the motor. The rotary shaft is selectively rotated in a first direction and a second direction opposite to the first direction. The rotary shaft has first threads. The coupling mechanism is provided between the rotary shaft and the rotary member, and selectively connects the rotary shaft to the rotary member. When the coupling mechanism connects the rotary shaft to the rotary member, rotation of the rotary member is transmitted to the rotary shaft. The movable body has second threads threadable into the first threads. The movable body moves along the axis of the rotary shaft as the rotary member rotates the rotary shaft with the second threads threaded into the first threads. The movable body moves in a third direction when the rotary member rotates the rotary shaft in the first direction. The movable body moves in a fourth direction opposite to the third direction when the rotary member rotates the rotary shaft in the second direction. The lock member is coupled to the movable body. The lock member moves between a lock position where it is engaged with the movable member to lock the movable member and an unlock position where it is disengaged from the movable member to unlock the movable member in accordance with movement of the movable body. The lock member moves toward the unlock position from the lock position when the movable body moves in the third direction. The lock member moves toward the lock position from the unlock position when the movable body moves in the fourth direction. The coupling mechanism disconnects the rotary shaft and the rotary member from each other as the rotary member rotates the rotary shaft in the second direction with the lock member placed at the lock position. This permits rotation of the rotary member with the rotary shaft and the rotary member being disconnected from each other.

BRIEF DESCRIPTION OF DRAWINGS

FIGS. 4A to 4C are schematic diagrams for explaining the operation of the electric steering lock device shown in FIG. 1 when the drive shaft of an electric motor maintains reverse rotation.

FIG. 5A is a side view showing a state in which the connection between a worm wheel and a rotary shaft is released in the electric steering lock device shown in FIG. 1.

FIG. 5B is a side view showing a steering shaft locked by the electric steering lock device shown in FIG. 1.

FIG. 5C is a side view showing the steering shaft unlocked by the electric steering lock device shown in FIG. 1.

FIG. 5D is a side view showing a state in which the connection between the rotary shaft and a lift member is released in the electric steering lock device shown in FIG. 1.

DESCRIPTION OF THE PREFERRED EMBODIMENT

One embodiment of the present invention will now be described with reference to FIGS. 1 to 7.

Figure 1:
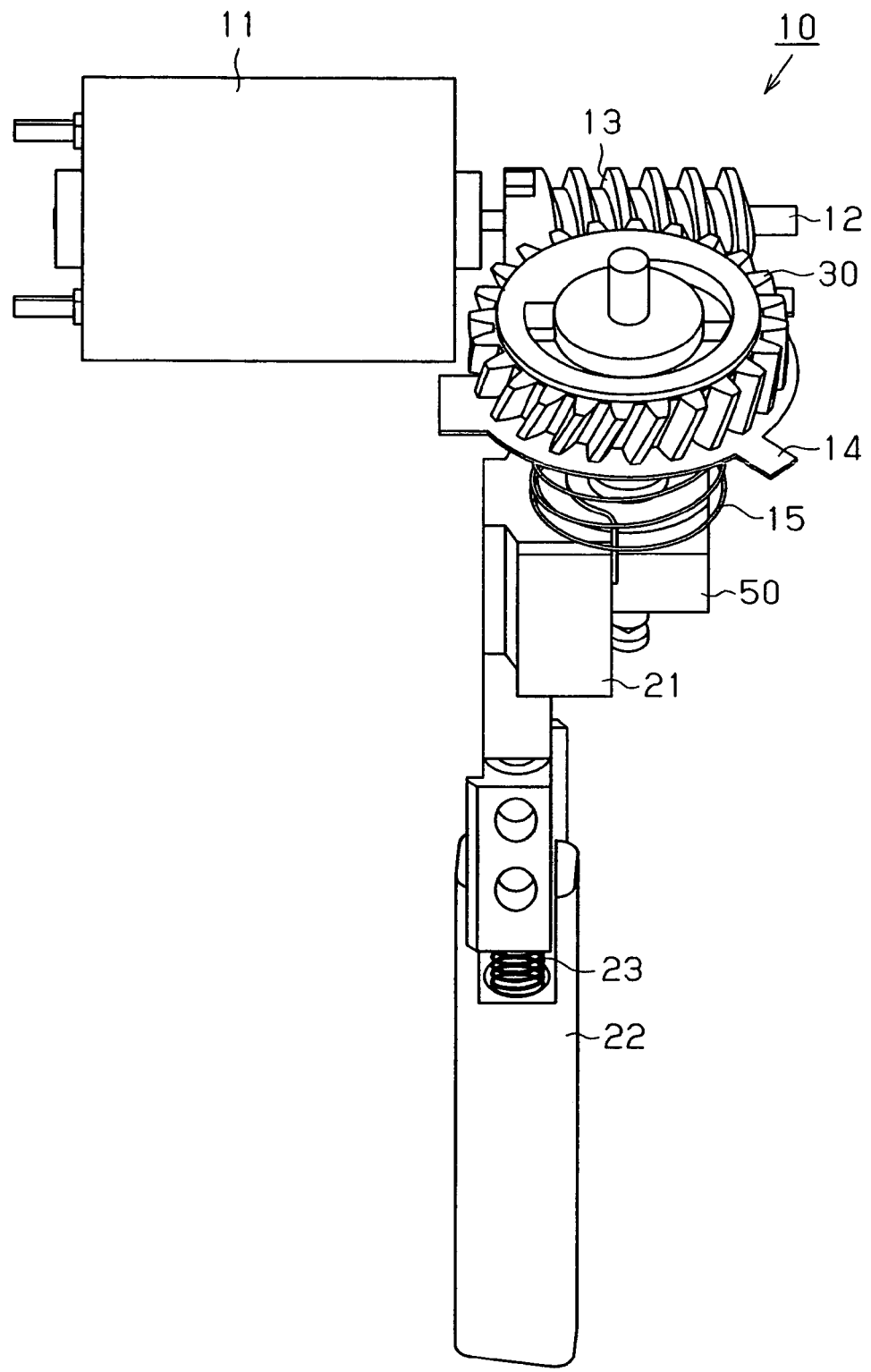
FIG. 1 is a perspective view showing an electric steering lock device according to one embodiment of the present invention.
Figure 2:
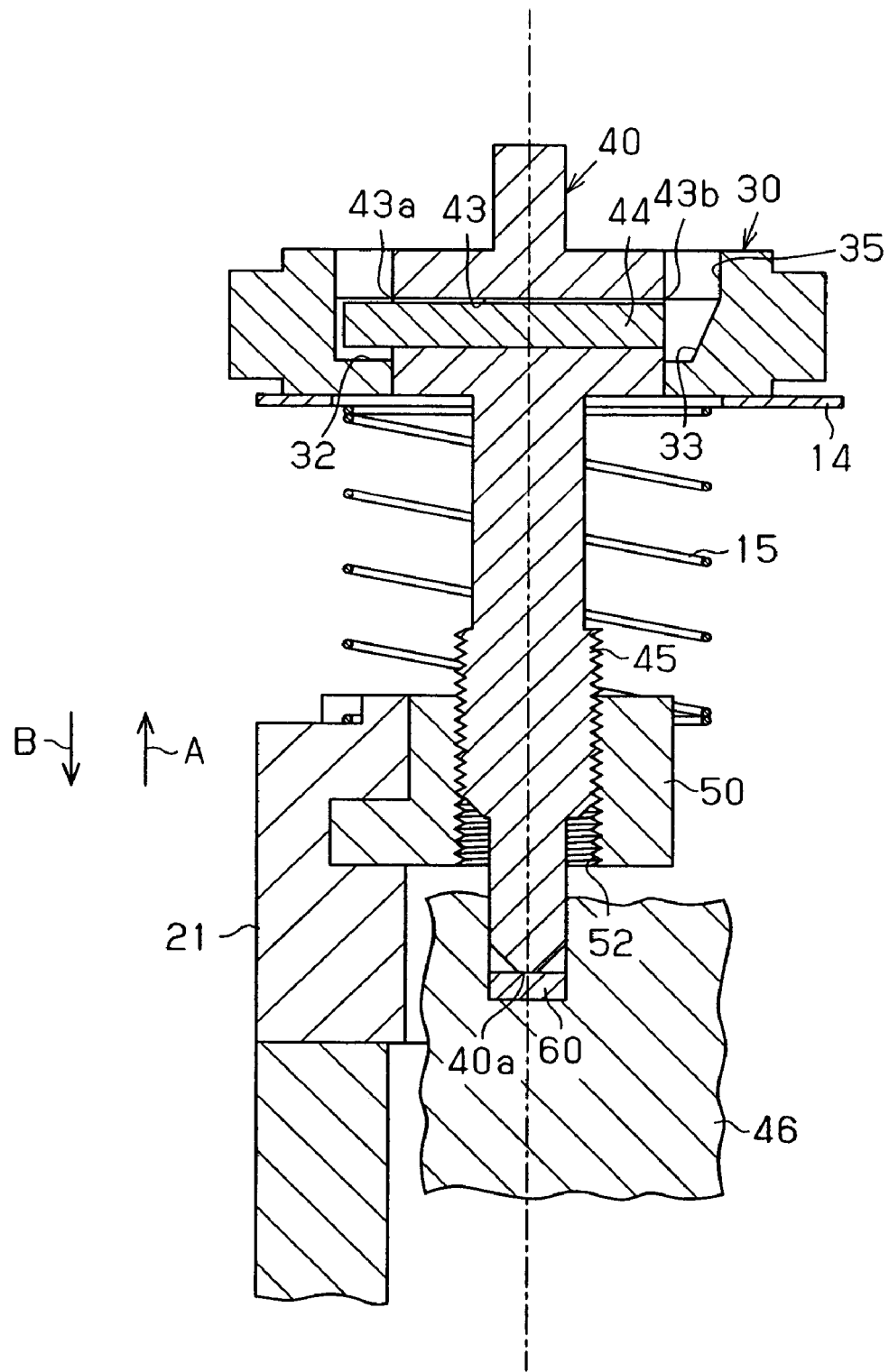
FIG. 2 is a cross-sectional view showing an essential portion of the electric steering lock device shown in FIG. 1.

An electric steering lock device 10 shown in FIG. 1 is attached to an unillustrated steering post of a vehicle. The electric steering lock device 10 is housed in a case 46 (see FIG. 2). FIG. 2 shows only a part of the case 46.

As shown in FIG. 1, the electric steering lock device 10 has an electric motor 11 which is driven by a vehicle-mounted battery. The operation of the electric motor 11 is controlled by an unillustrated control unit, such as a microcontroller. A worm 13 is provided on a drive shaft 12 of the electric motor 11. The worm 13 rotates together with the drive shaft 12. The worm 13 engages with a rotary member or a worm wheel 30 and rotates the worm wheel 30. The worm wheel 30 is supported on a support plate 14 fixed to the case 46.

Figure 3:
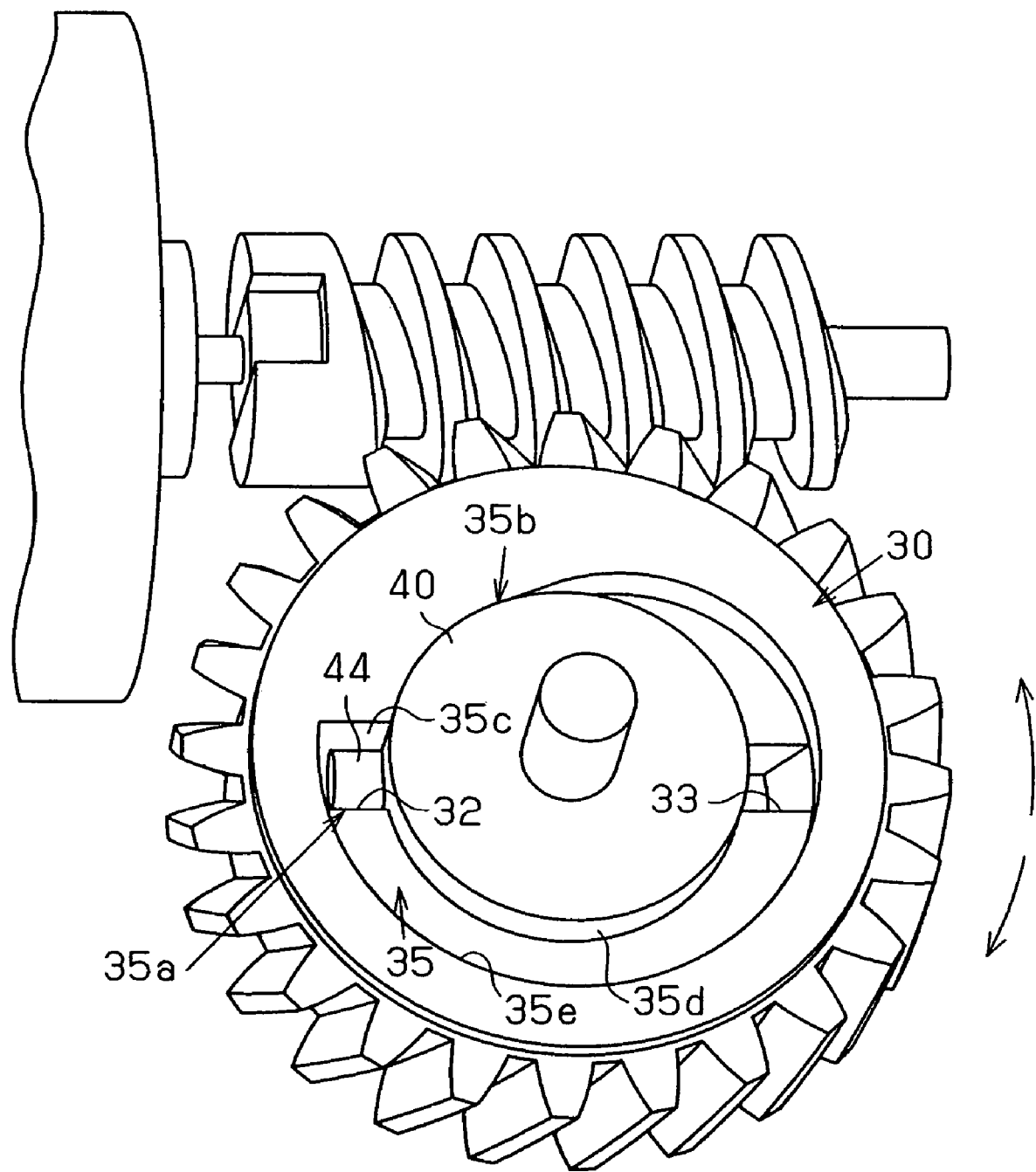
FIG. 3 is a perspective view showing another essential portion of the electric steering lock device shown in FIG. 1.

As shown in FIGS. 2 and 3, the proximal end portion (large-diameter portion) of a rotary shaft 40 is inserted into the center of the worm wheel 30. The inserted rotary shaft 40 is movable along the axis of the rotary shaft 40. The worm wheel 30 and the rotary shaft 40 are arranged coaxially.

An arcuate groove or a guide groove 35 which extends in an arcuate shape around the central axis of the worm wheel 30 is formed at the top surface of the worm wheel 30 in which the rotary shaft 40 is inserted. An outer side surface 35e of the guide groove 35 in the radial direction of the worm wheel 30 and the bottom of the guide groove 35 are defined by the worm wheel 30. An inner side surface 35d of the guide groove 35 is defined by the peripheral surface of the rotary shaft 40. As shown in FIG. 3, the guide groove 35 has a start end 35a and a terminal end 35b and has a center angle of approximately 270 degrees. An engagement surface 35c orthogonal to the extending direction of the guide groove 35 is formed at the start end 35a of the guide groove 35.

The width of the guide groove 35 is uniform except for the portion of the guide groove 35 which lies near the terminal end 35b. More specifically, the width of the guide groove 35 is uniform between the start end 35a and the portion of the guide groove 35 which is located 180 degrees apart from the terminal end 35b. The portion of the outer side surface 35e which lies near the terminal end 35b comes closer to the inner side surface 35d as it approaches the terminal end 35b. At the terminal end 35b, the inner side surface 35d and the outer side surface 35e of the guide groove 35 overlie each other.

The worm wheel 30 has a first recess portion 32 at the portion of the guide groove 35 which corresponds to the start end 35a. The worm wheel 30 further has a second recess portion 33 at the portion of the guide groove 35 which is located 180 degrees apart from the first recess portion 32. The engagement surface 35c is positioned on the same plane as a part of the wall surface that defines the first recess portion 32, and is linked to that part of the wall surface.

As shown in FIGS. 2 and 3, the worm wheel 30 and the rotary shaft 40 can be connected by a pin 44 which is orthogonal to the axis of the rotary shaft 40. The pin 44 is inserted into a through hole 43 provided in the proximal end portion of the rotary shaft 40. The inserted pin 44 is movable along the axis of the through hole 43 orthogonal to the axis of the rotary shaft 40. The through hole 43 extends in the radial direction of the rotary shaft 40 and has a first end portion 43a and a second end portion 43b. The length of the pin 44 is longer than the length of the through hole 43. Accordingly, at least one end portion of the pin 44 is positioned outside the through hole 43. In other words, the pin 44 is protruding from the peripheral surface of the rotary shaft 40 in the radial direction of the rotary shaft 40. As the pin 44 moves in the through hole 43, the end portion of the pin 44 which is positioned outside the through hole 43 extends and retracts with respect to the peripheral surface of the rotary shaft 40.

The end portion of the pin 44 that is positioned outside the through hole 43 is engaged with the first recess portion 32 or the second recess portion 33 in a disengageable manner. When the end portion of the pin 44 that is positioned outside the through hole 43 is engaged with the first recess portion 32 or the second recess portion 33, the rotary shaft 40 is coupled to the worm wheel 30 and the rotary shaft 40 rotates about its own axis according to the rotation of the worm wheel 30. The first recess portion 32 and the pin 44 function as a coupling mechanism to selectively connect the rotary shaft 40 to the worm wheel 30.

First threads or male threads 45 are formed in a position located halfway along the axial direction of the rotary shaft 40. Second threads or female threads 52 are provided on a movable body, i.e., a lift member 50, which can be thread-ably engaged with the male threads 45. With the female threads 52 of the lift member 50 engaged with the male threads 45 of the rotary shaft 40, the rotary shaft 40 and the lift member 50 function as a feed screw mechanism to convert the rotational motion of the rotary shaft 40 to reciprocal motion of the lift member 50. The lift member 50 reciprocates along the axis of the rotary shaft 40.

A lock stopper 21 is secured to the lift member 50. A lock member or a lock bar 22 is coupled to the lock stopper 21 via a first coil spring 23. The first coil spring 23 urges the lock stopper 21 and the lock bar 22 in a direction to position them away from each other. A second coil spring 15 is located between the support plate 14 and the lift member 50. The second coil spring 15 urges the lift member 50 along the axis of the rotary shaft 40 in a direction to position them away from each other.

A stopper 60 is provided at the case 46 in such a way as to face a distal end 40a of the rotary shaft 40. The distal end 40a of the rotary shaft 40 is abuttable on the stopper 60. When the distal end 40a of the rotary shaft 40 abuts on the stopper 60, the downward movement of the rotary shaft 40 along its own axis in FIG. 2 is restricted. When the distal end 40a of the rotary shaft 40 abuts on the stopper 60, the end portion of the pin 44 which is positioned outside the through hole 43 is engaged with the first recess portion 32 or the second recess portion 33.

Next, the operation of the electric steering lock device 10 will be discussed.

The electric steering lock device 10 selectively locks a movable member, i.e., a steering shaft 25 which moves in response to an unillustrated steering wheel. At the time of locking, as shown in FIG. 5B, a distal end 22a of the lock bar 22 is engaged with a recess portion 25a provided at the steering shaft 25. At the time of locking, normally, the distal end 40a of the rotary shaft 40 abuts on the stopper 60, causing the end portion of the pin 44, which is positioned outside the through hole 43, to be engaged with the first recess portion 32 or the second recess portion 33 (see FIG. 2). When the steering shaft 25 is locked, the steering wheel becomes inoperable. Hereinafter, the position of the lock bar 22 when the distal end 22a of the lock bar 22 is engaged with the recess portion 25a is called the "lock position."

At the time of unlocking the locked steering shaft 25, the control unit rotates the drive shaft 12 of the electric motor 11 forward. Then, the rotary shaft 40 rotates forward via the worm 13, the worm wheel 30 and the pin 44. As the male threads 45 are threaded into the female threads 52 at this time, the moving force in the direction indicated by the arrow B in FIG. 2 acts on the rotary shaft 40 that rotates forward. Because the distal end 40a of the rotary shaft 40 is abutting on the stopper 60, however, the rotary shaft 40 does not change its axial position but moves the lift member 50 in the direction indicated by the arrow A in FIG. 2 against the urging force of the second coil spring 15. This causes the distal end 22a of the lock bar 22 to move so as to disengage from the recess portion 25a of the steering shaft 25, as shown in FIG. 5C. As a result, the steering shaft 25 is unlocked so as to be rotatable. Hereinafter, the position of the lock bar 22 when the distal end 22a of the lock bar 22 is not engaged with the recess portion 25a is called the "unlock position".

Figure 7:
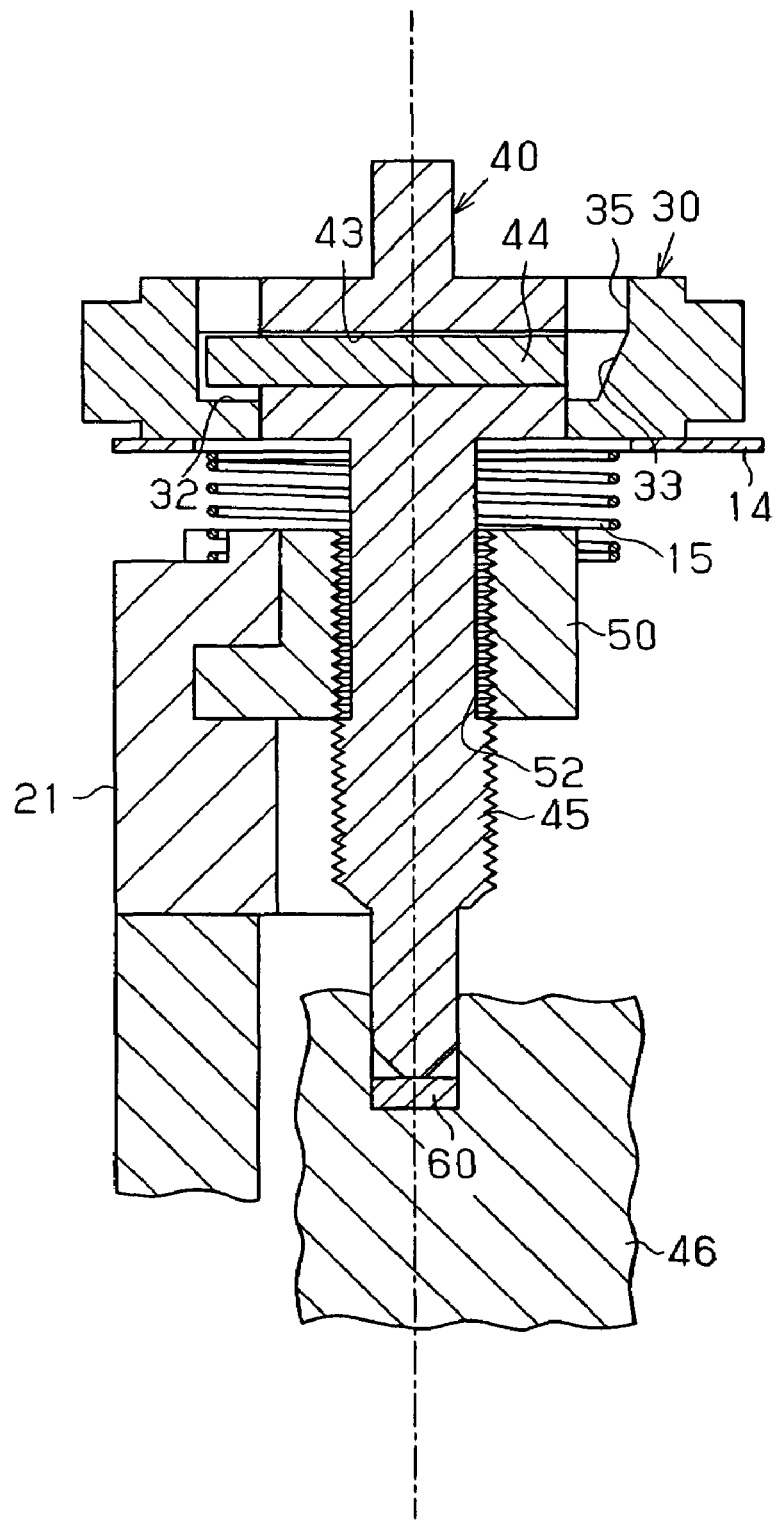
FIG. 7 is a cross-sectional view showing an essential portion of the electric steering lock device shown in FIG. 5D.

In a case where the drive shaft 12 maintains rotating forward further after the lock bar 22 reaches the unlock position, the female threads 52 is eventually disengaged from the male threads 45 as shown in FIGS. 5D and 7. As a result, connection between the rotary shaft 40 and the lift member 50 is released, and the rotary shaft 40 can be in an idling state with the movement of the lift member 50 stopped. With the steering shaft 25 unlocked, therefore, the electric motor 11 can rotate the drive shaft 12 forward without being overloaded.

The female threads 52, which have disengaged from the male threads 45, are urged toward the male threads 45 by the second coil spring 15. When the drive shaft 12 is rotated reversely while the connection between the rotary shaft 40 and the lift member 50 is released, therefore, the male threads 45 and the female threads 52 are quickly threaded together. This connects the rotary shaft 40 to the lift member 50 so that the lift member 50 becomes movable in response to the rotation of the rotary shaft 40.

At the time of locking the unlocked steering shaft 25, the control unit rotates the drive shaft 12 of the electric motor 11 reversely. Then, the rotary shaft 40 that is rotating reversely moves the lift member 50 in the direction indicated by the arrow B in FIG. 2. This causes the distal end 22a of the lock bar 22 to move so as to engage with the recess portion 25a of the steering shaft 25, as shown in FIG. 5B. As a result, the steering shaft 25 is locked to be disabled from rotating.

Figure 6:
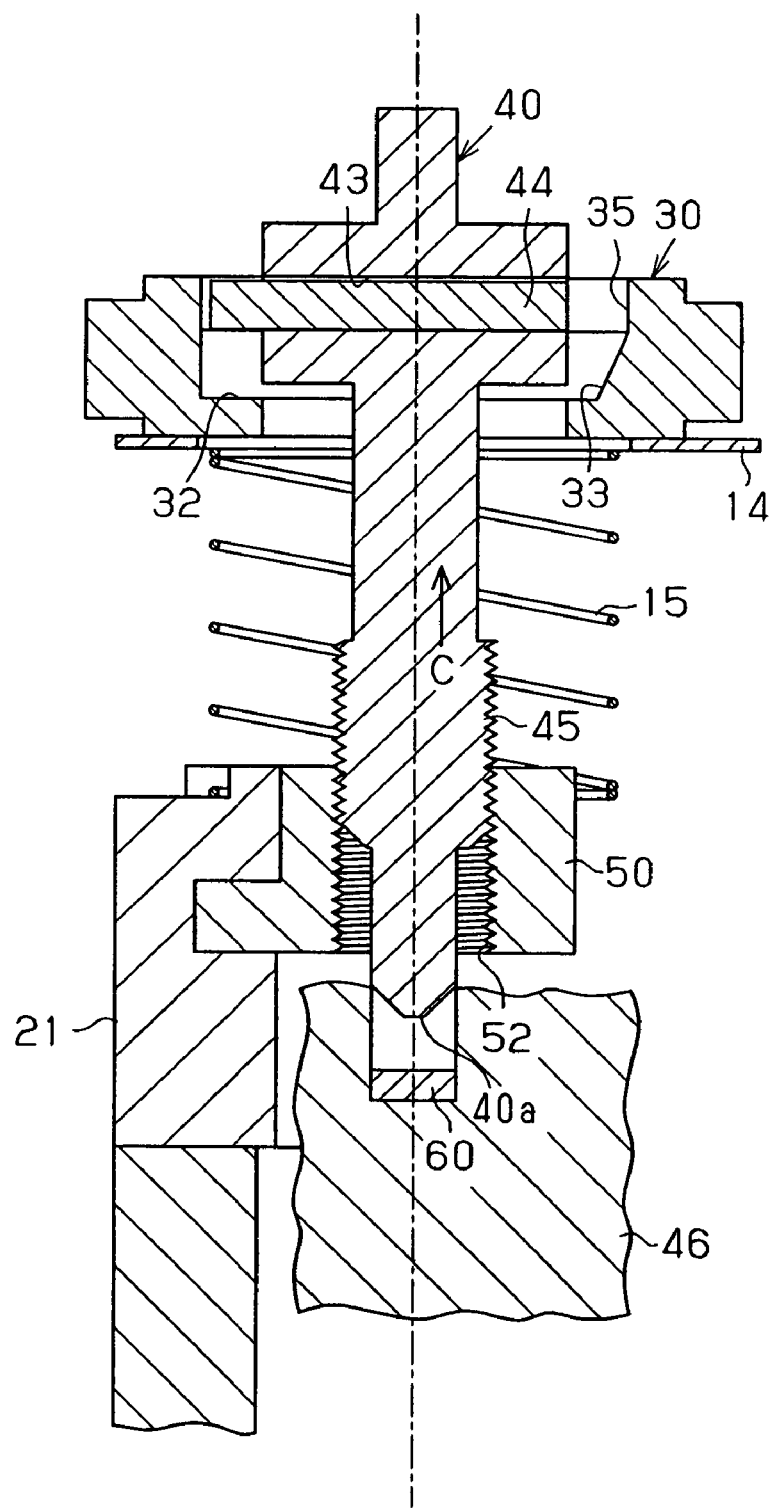
FIG. 6 is a cross-sectional view showing an essential portion of the electric steering lock device shown in FIG. 5A.

In a case where the drive shaft 12 maintains reverse rotation further after the lock bar 22 reaches the lock position, the male threads 45 are disengaged from the female threads 52. However, the lock bar 22 engaged with the steering shaft 25 cannot further move toward the steering shaft 25. Therefore, as shown in FIGS. 5A and 6, the rotary shaft 40 moves in the direction indicated by the arrow C in FIG. 6 along its own axis. Accordingly, the end portion of the pin 44, which is positioned outside the through hole 43, disengages from the recess portions 32, 33, disconnecting the worm wheel 30 and the rotary shaft 40 from each other. The end portion of the pin 44 that has disengaged from the recess portions 32, 33 is placed in the guide groove 35. At this time, a portion of the male threads 45 are threaded into the female threads 52.

The end portion of the pin 44, shown in FIG. 4A, which protrudes from the first end portion 43a of the through hole 43 abuts on the outer side surface 35e of the guide groove 35 when the worm wheel 30 rotates by about 180 degrees clockwise from the state shown in FIG. 4A according to the reverse rotation of the drive shaft 12. When the worm wheel 30 further rotates clockwise, the end portion of the pin 44 is retracted into the through hole 43 while sliding on the outer side surface 35e of the guide groove 35 as shown in FIG. 4B. When the worm wheel 30 further rotates by about 60 degrees clockwise from the state shown in FIG. 4B, the pin 44 does not protrude from the first end portion 43a of the through hole 43 but protrudes only from the second end portion 43b, as shown in FIG. 4C. When the worm wheel 30 further rotates clockwise from the state shown in FIG. 4C, the end portion of the pin 44 that is protruding from the second end portion 43b slides on the outer side surface 35e of the guide groove 35 and is retracted into the through hole 43. The worm wheel 30 whose connection to the rotary shaft 40 is released in this manner can idle with respect to the rotary shaft 40. Therefore, the electric motor 11 can keep rotating the drive shaft 12 reversely without being overloaded while the steering shaft 25 is locked.

When the drive shaft 12 is rotated forward while the connection between the worm wheel 30 and the rotary shaft 40 is released, the worm wheel 30 rotates counterclockwise in FIGS. 4A to 4C. The end portion of the pin 44 which is positioned outside the through hole 43 moves in the guide groove 35 according to the forward rotation of the drive shaft 12 and eventually abuts on the engagement surface 35c as shown in FIG. 4A. Accordingly, the rotary shaft 40 becomes rotatable together with the worm wheel 30 according to the forward rotation of the drive shaft 12. When the rotary shaft 40 rotates, together with the worm wheel 30, counterclockwise from the state shown in FIG. 4A, the rotary shaft 40 moves downward in FIG. 6 along its own axis. As a result, the portion of the pin 44 which abuts on the engagement surface 35c enters into the first recess portion 32. When the rotary shaft 40 moves until the distal end 40a of the rotary shaft 40 abuts on the stopper 60, the lift member 50 becomes movable in response to the rotation of the rotary shaft 40.

The present embodiment has the following advantages.

When the drive shaft 12 further maintains forward rotation with the lock bar 22 at the unlock position, the rotary shaft 40 can idle with respect to the lift member 50. Even if the drive shaft 12 keeps rotating forward, therefore, the electric motor 11 is not overloaded. That is, the electric motor 11 is prevented from being overloaded when the steering shaft 25 is unlocked. The electric steering lock device 10 according to this embodiment uses the feed screw mechanism. The feed screw mechanism is durable to a large load, and operates properly even if the drive force of the electric motor 11 is relatively large.

The female threads 52 that disengage from the male threads 45 are urged toward the male threads 45 by the second coil spring 15. Therefore, the rotary shaft 40 whose connection to the lift member 50 is released is easily connected again to the lift member 50 merely by rotating the drive shaft 12 reversely.

When the drive shaft 12 keeps rotating reversely with the lock bar 22 at the lock position, the worm wheel 30 can idle with respect to the rotary shaft 40. Even when the drive shaft 12 keeps rotating reversely, therefore, the electric motor 11 is not overloaded. That is, the electric motor 11 is prevented from being overloaded when the steering shaft 25 is locked.

The guide groove 35 has the engagement surface 35c which can abut on the end portion of the pin 44 that moves in the guide groove 35 in accordance with the forward rotation of the drive shaft 12. Therefore, the rotary shaft 40 whose connection to the worm wheel 30 is released is easily connected again to the worm wheel 30 merely by rotating the drive shaft 12 forward and can be rotated together with the worm wheel 30.

The embodiment may be modified as follows.

Figure 8:
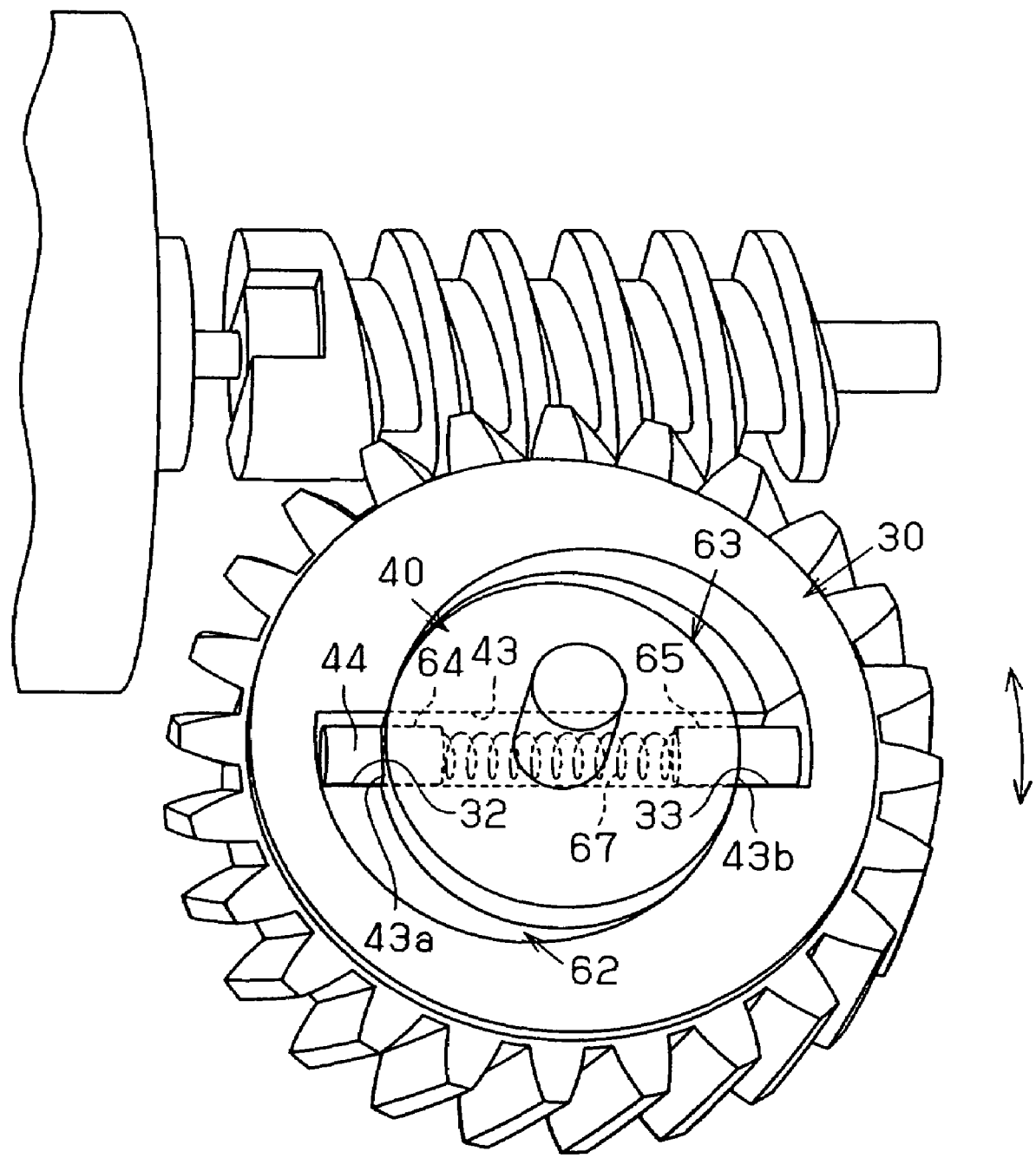
FIG. 8 is a perspective view showing essential portions of an electric steering lock device according to another embodiment of the present invention.

As shown in FIG. 8, instead of the guide groove 35, two guide grooves 62 and 63 may be formed at the top surface of the worm wheel 30 in which the rotary shaft 40 is inserted. The guide grooves 62 and 63 extend in an arcuate shape around the central axis of the worm wheel 30 and have a center angle of approximately 180 degrees. The width of the guide grooves 62, 63 becomes smaller as it approaches the terminal end from the start end. In this case, the first recess portion 32 is provided at a position which corresponds to the start end of one guide grooves 62. The pin 44 is replaced with two pins 64 and 65. The pins 64 and 65 are inserted into the through hole 43 while being urged in opposite directions with respect to each other by a coil spring 67. In this modification, power is transmitted to the rotary shaft 40 from the worm wheel 30 via the two pins 64 and 65 set apart by 180 degrees. It is therefore possible to execute stable power transmission as compared with the above-described embodiment.

The invention claimed is:

1. An electric steering lock device for selectively locking a movable member, which moves in response to a steering wheel, the device comprising:

a motor;

a rotary member, which is rotated by said motor;

a rotary shaft, which is selectively rotated in a first direction and a second direction opposite to the first direction and has first threads;

a coupling mechanism, which is provided between said rotary shaft and said rotary member, and selectively connects said rotary shaft to said rotary member, whereby when the coupling mechanism connects said rotary shaft to said rotary member, rotation of said rotary member is transmitted to said rotary shaft;

a movable body, which has second threads, threadably engagable within said first threads, moves along the axis of said rotary shaft as said rotary shaft rotates with the second threads threadably engaged within said first threads, moves in a third direction when said rotary shaft rotates in said first direction, and moves in a fourth direction opposite to the third direction when said rotary shaft rotates in said second direction; and a lock member, which is coupled to said movable body, moves between a lock position where the lock member is engaged with the movable member to lock said movable member and an unlock position where the lock member is disengaged from the movable member to unlock said movable member in accordance with movement of said movable body, moves toward the unlock position from the lock position when said movable body moves in said third direction, and moves toward the lock position from the unlock position when said movable body moves in said fourth direction, wherein as said rotary shaft rotates in said first direction with said lock member placed at said unlock position, said first threads permits said second threads to disengage from said first threads, thereby permitting rotation of said rotary shaft in said first direction with said second threads disengaged from said first threads, wherein said coupling mechanism disconnects said rotary shaft and said rotary member from each other as said rotary member rotates said rotary shaft in said second direction with said lock member placed at said lock position, thereby permitting rotation of said rotary member with said rotary shaft and said rotary member being disconnected from each other.

2. The device according to claim 1, wherein as said rotary shaft rotates in said second direction, said first threads permit said second threads, disengaged from said first threads, to be threaded onto said first threads again.

3. The device according to claim 1, further comprising an urging member, which urges said movable body in said fourth direction.

4. The device according to claim 1, wherein said rotary shaft is movable in a axial direction with respect to said rotary member, and said coupling mechanism connects or disconnects said rotary shaft to or from said rotary member in accordance with axial movement of said rotary shaft with respect to said rotary member.

5. The device according to claim 4, wherein as said rotary member rotates said rotary shaft in said second direction with said lock member placed at said lock position, said rotary shaft moves in said third direction with respect to said rotary member, thereby disconnecting said rotary shaft and said rotary member from each other.

6. The device according to claim 1, wherein said rotary member is provided coaxially with said rotary shaft and rotates together with said rotary shaft when connected to said rotary shaft.

7. An electric steering lock device for selectively locking a movable member, which moves in response to a steering wheel, the device comprising:

a motor;

a rotary member, which is rotated by said motor;

a rotary shaft, which is selectively rotated by said rotary member in a first direction and a second direction opposite to the first direction and has first threads;

a coupling mechanism, which is provided between said rotary shaft and said rotary member, and selectively connects said rotary shaft to said rotary member, whereby when the coupling mechanism connects said rotary shaft to said rotary member, rotation of said rotary member is transmitted to said rotary shaft, a movable body, which has second threads threadable into said first threads, moves along the axis of said rotary shaft as said rotary member rotates said rotary shaft with the second threads threaded into said first threads, moves in a third direction when said rotary member rotates said rotary shaft in said first direction, and moves in a fourth direction opposite to the third direction when said rotary member rotates said rotary shaft in said second direction; and a lock member, which is coupled to said movable body, moves between a lock position where the lock member is engaged with the movable member to lock said movable member and an unlock position where the lock member is disengaged from the movable member to unlock said movable member in accordance with movement of said movable body, moves toward the unlock position from the lock position when said movable body moves in said third direction, and moves toward the lock position from the unlock position when said movable body moves in said fourth direction, wherein said coupling mechanism disconnects said rotary shaft and said rotary member from each other as said rotary member rotates said rotary shaft in said second direction with said lock member placed at said lock position, thereby permitting rotation of said rotary member with said rotary shaft and said rotary member being disconnected from each other.

8. The device according to claim 7, wherein said rotary shaft is movable in an axial direction with respect to said rotary member, and said coupling mechanism connects or disconnects said rotary shaft to or from said rotary member in accordance with axial movement of said rotary shaft with respect to said rotary member.

9. The device according to claim 8 wherein as said rotary member rotates said rotary shaft in said second direction with said lock member placed at said lock position, said rotary shaft moves in said third direction with respect to said rotary member, thereby disconnecting said rotary shaft and said rotary member from each other.

10. The device according to claim 7, wherein said rotary member is provided coaxially with said rotary shaft and rotates together with said rotary shaft when connected to said rotary shaft.

11. The device according to claim 10, wherein as said rotary member rotates in said first direction, said coupling mechanism connects said rotary shaft, disconnected from said rotary member, to said rotary member again.

12. The device according to claim 7, wherein said coupling mechanism includes:
a first engagement portion provided in said rotary member; and
a second engagement portion, which is provided in said rotary shaft and engages with said first engagement portion in a disengageable manner.

13. The device according to claim 12 wherein said rotary shaft is provided coaxially with said rotary member and is inserted into said rotary member in an axially movable manner, said first engagement portion is a recess portion provided at a position apart from a central axis of said rotary member, and said second engagement portion is a pin, which extends radially from a peripheral surface of said rotary shaft and engages with or disengages from the recess portion in accordance with axial movement of said rotary shaft with respect to said member.

14. The device according to claim 13, wherein said pin is extendable and retractable with respect to the peripheral surface of said rotary shaft,
said rotary member has an arcuate groove extending around the axis thereof, the arcuate groove includes a radially outer and inner side surface, the radially inner side surface being defined by the peripheral surface of said rotary shaft, and the radially outer side surface being defined by said rotary member, said arcuate groove has a start end and a terminal end, said outer side surface of the arcuate groove comes closer to said inner side surface as said outer side surface of the arcuate groove approaches said terminal end, said recess portion is provided at said start end of the arcuate groove, and said pin disengaged from said recess portion is placed in said arcuate groove, and
an engagement surface lined to a wall surface, which defines said recess portion, is formed at said start end, and engages with said pin only when said rotary member rotates in said first direction with said pin in said arcuate groove, whereby said rotary shaft rotates together with said rotary member in the first direction.

15. The device according to claim 14, wherein while said rotary member is rotating in said second direction with said pin placed in said arcuate groove, said outer side surface of the arcuate groove presses said pin in such a way as to cause said pin to extend and retract with respect to the peripheral surface of said rotary shaft, thereby inhibiting engagement of said pin with said engagement surface.

16. An electric steering lock device for selectively locking a movable member, which moves in response to a steering wheel, the device comprising:
a motor;
a rotary member, which is rotated by said motor;
a rotary shaft, which is selectively rotated in a first direction and a second direction opposite to the first direction and has first threads;
a coupling mechanism, which is provided between said rotary shaft to said rotary member, and selectively connects said rotary shaft to said rotary member, whereby when the coupling mechanism connects said rotary shaft to said rotary member, rotation of said rotary member is transmitted to said rotary shaft;
a movable body, which has second threads, threadably engagable within said first threads, moves along the axis of said rotary shaft as said rotary shaft rotates with the second threads threadably engaged within said first threads, moves in a third direction when said rotary shaft rotates in said first direction, and moves in a fourth direction opposite to the third direction when said rotary shaft rotates in said second direction;
a lock member, which is coupled to said movable body, moves between a lock position where the lock member is engaged with the movable member to lock said movable member and an unlock position where the lock member is disengaged from the movable member to unlock said movable member in accordance with movement of said movable body, moves toward the unlock position from the lock position when said movable body moves in said third direction, and moves toward the lock position from the unlock position when said movable body moves in said fourth direction; and
an urging member, which urges said movable body in said fourth direction,
wherein as said rotary shaft rotates in said first direction with said lock member placed at said unlock position, said first threads permits said second threads to disengage from said first threads, thereby permitting rotation of said rotary shaft in said first direction with said second threads disengaged from said first threads,
wherein said coupling mechanism disconnects said rotary shaft and said rotary member from each other as said rotary member rotates said rotary shaft in said second direction with said lock member placed at said lock position, thereby permitting rotation of said rotary member with said rotary shaft and said rotary member being disconnected from each other.

* * * * *